(12) United States Patent
Aso

(10) Patent No.: US 10,988,184 B2
(45) Date of Patent: Apr. 27, 2021

(54) FENDER STRUCTURE FOR VEHICLE

(71) Applicant: TOYOTA JIDOSHA KABUSHIKI KAISHA, Aichi-ken (JP)

(72) Inventor: Shuichi Aso, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 125 days.

(21) Appl. No.: 16/459,533

(22) Filed: Jul. 1, 2019

(65) Prior Publication Data

US 2020/0031403 A1 Jan. 30, 2020

(30) Foreign Application Priority Data

Jul. 26, 2018 (JP) .............................. JP2018-140568

(51) Int. Cl.
  *B62D 25/16* (2006.01)
  *B62D 25/18* (2006.01)
  *B60R 19/18* (2006.01)

(52) U.S. Cl.
  CPC .............. *B62D 25/16* (2013.01); *B62D 25/18* (2013.01); *B60R 19/18* (2013.01)

(58) Field of Classification Search
  CPC .... B62D 25/16; B62D 25/168; B62D 21/157; B62D 25/18
  USPC ....... 188/371, 376, 377; 296/187.12, 187.09, 296/187.1, 203.01, 203.02, 193.09
  See application file for complete search history.

(56) References Cited

U.S. PATENT DOCUMENTS

| 6,824,199 | B2 * | 11/2004 | Weik ................... | B62D 25/082 296/187.04 |
| 7,832,793 | B2 * | 11/2010 | Garnweidner .......... | B60R 21/34 296/187.04 |
| 2011/0037293 | A1 * | 2/2011 | Kralevich ............... | B60R 21/34 296/198 |
| 2015/0197214 | A1 * | 7/2015 | Marur .................. | B60Q 1/0491 188/377 |
| 2018/0236956 | A1 * | 8/2018 | Yamamoto ............. | B62D 25/08 |

FOREIGN PATENT DOCUMENTS

| DE | 10009364 A1 | 8/2001 |
| JP | S62-97888 U | 6/1987 |
| JP | 2009-227188 A | 10/2009 |
| JP | 2018-65501 A | 4/2018 |

\* cited by examiner

*Primary Examiner* — Dennis H Pedder
*Assistant Examiner* — Joyce Eileen Hill
(74) *Attorney, Agent, or Firm* — Hauptman Ham, LLP

(57) ABSTRACT

A fender structure for a vehicle includes: a fender panel that is disposed on a lateral surface of a vehicle-body front portion; a reinforcing member that supports the fender panel from the inner side in the vehicle width direction; a first engagement portion that is able to engage with a top end portion of the fender panel; a second engagement portion that is able to engage with a bottom end portion of the fender panel; and a spring portion that biases the first engagement portion and the second engagement portion with an elastic restoring force in the vehicle height direction in which the first engagement portion and the second engagement portion are separated from each other in a state in which the first engagement portion and the second engagement portion engage with the top end portion and the bottom end portion of the fender panel.

5 Claims, 10 Drawing Sheets

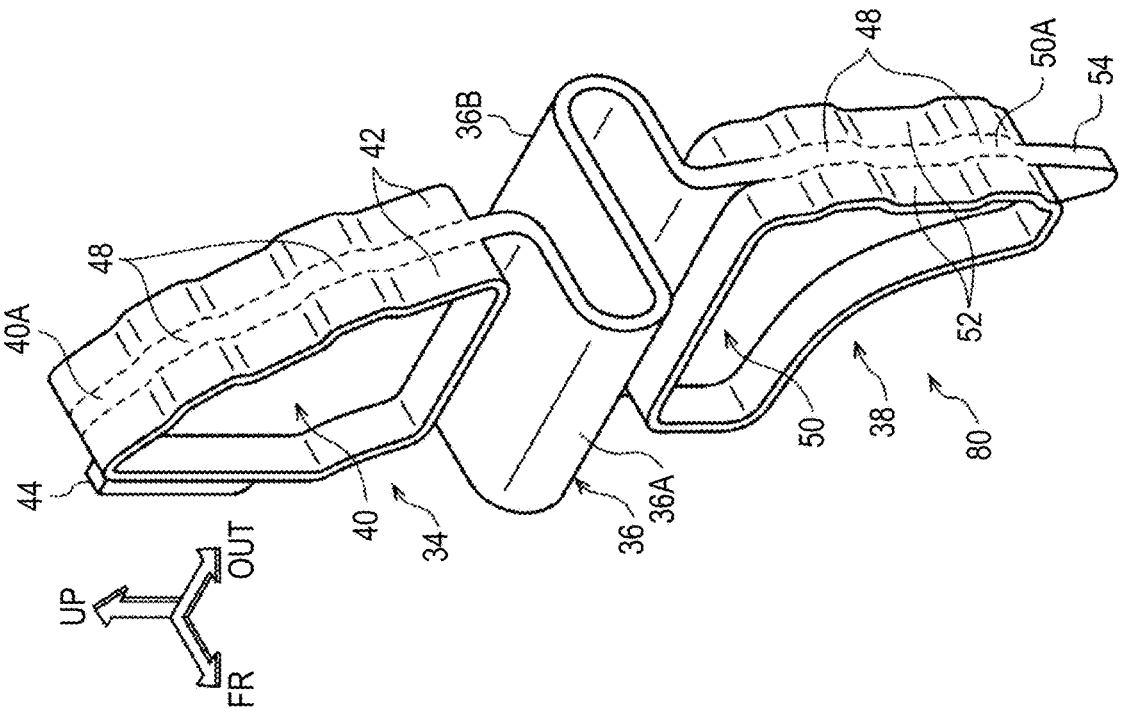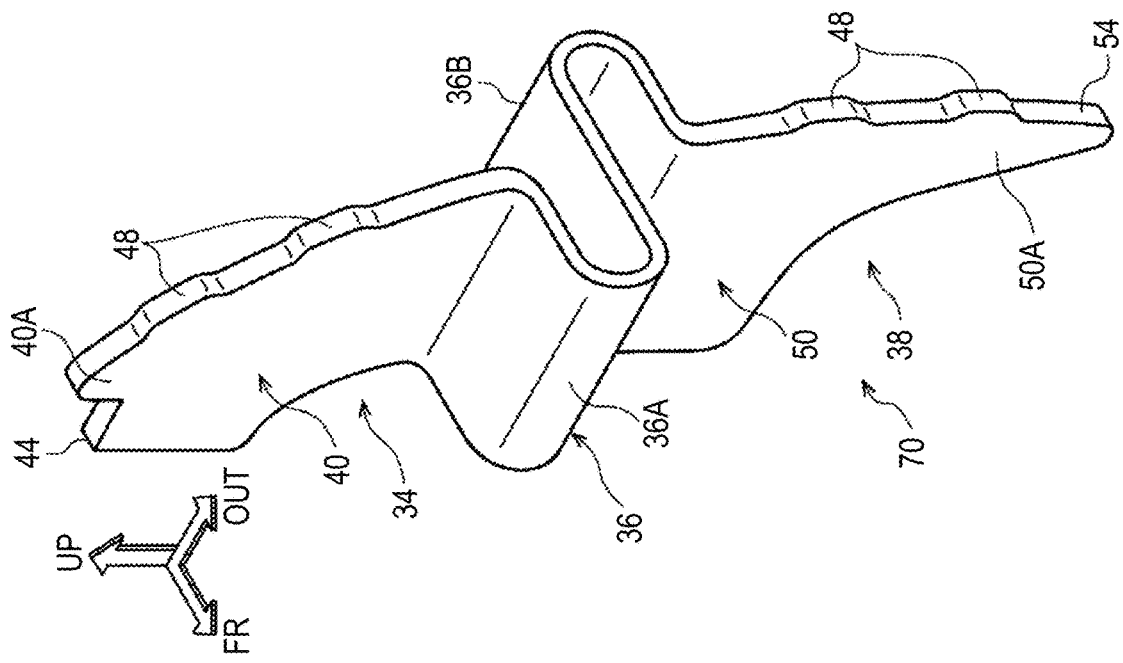

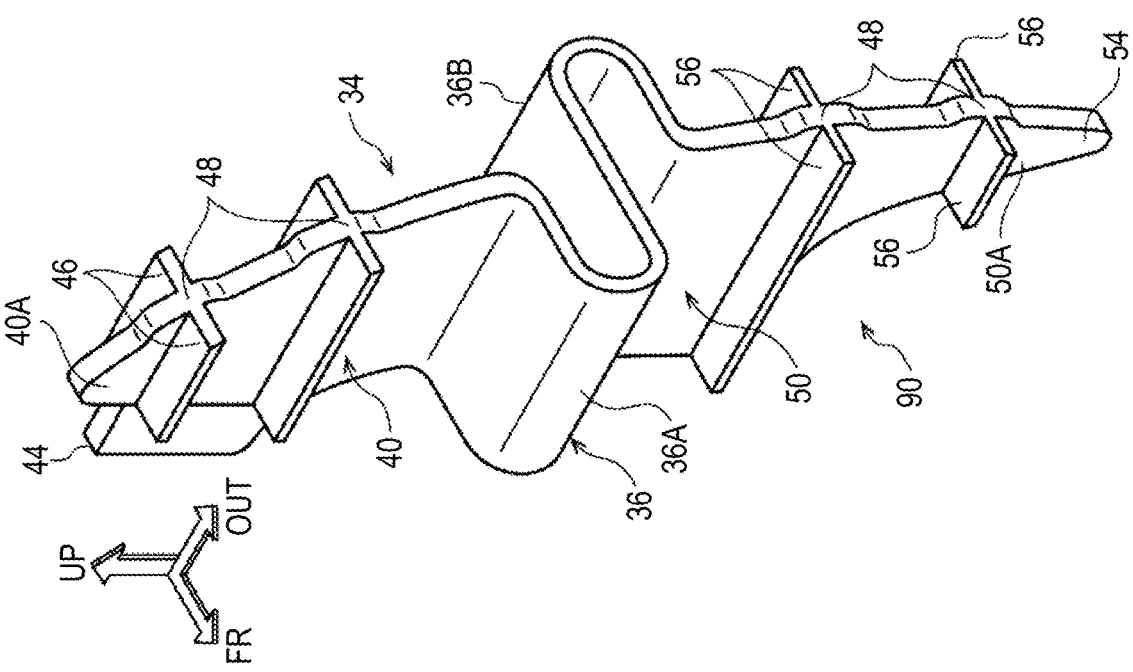

FENDER STRUCTURE FOR VEHICLE

INCORPORATION BY REFERENCE

The disclosure of Japanese Patent Application No. 2018-140568 filed on Jul. 26, 2018 including the specification, drawings and abstract is incorporated herein by reference in its entirety.

BACKGROUND

1. Technical Field

The disclosure relates to a fender structure for a vehicle.

2. Description of Related Art

As a fender structure for a vehicle, a structure that can improve rigidity or shock absorbability of a fender with a block member formed of a foamed resin disposed on the inside in a vehicle width direction of a fender panel is disclosed in Japanese Unexamined Patent Application Publication No. 2018-065501 (JP 2018-065501 A). This block member is inserted from a gap formed at a bottom end portion of the fender panel in a state in which the block member is reduced by elastic deformation. Thereafter, when the block member is elastically restored, the block member is pressed by an inner surface in the vehicle width direction of the fender panel and a sub member and the block member is positioned.

SUMMARY

However, in the related art, when the block member is deformed due to an influence of vibration or the like during travel, it is considered to be difficult for the block member to maintain its position at the time of assembly. Accordingly, there is room for improvement in reinforcing a target portion of the fender panel.

The disclosure provides a fender structure for a vehicle including a reinforcing member that can reinforce a target portion of a fender panel.

According to an aspect of the disclosure, there is provided a fender structure for a vehicle, including: a fender panel that is disposed on a lateral surface of a vehicle-body front portion; a reinforcing member that is disposed on an inner side in a vehicle width direction of the fender panel, extends in a vehicle height direction and the vehicle width direction, and supports the fender panel from the inner side in the vehicle width direction; a first engagement portion that is disposed in a top end portion of the reinforcing member and is able to engage with a top end portion of the fender panel; a second engagement portion that is disposed in a bottom end portion of the reinforcing member and is able to engage with a bottom end portion of the fender panel; and a spring portion that is disposed in an intermediate portion in the vehicle height direction of the reinforcing member and biases the first engagement portion and the second engagement portion with an elastic restoring force in the vehicle height direction in which the first engagement portion and the second engagement portion are separated from each other in a state in which the first engagement portion and the second engagement portion engage with the top end portion and the bottom end portion of the fender panel.

In the fender structure for a vehicle according to the aspect, the fender panel is reinforced by the reinforcing member that supports the fender panel from the inner side in the vehicle width direction. The reinforcing member includes the first engagement portion disposed in the top end portion and the second engagement portion disposed in the bottom end portion thereof, and is able to engage with the top end portion and the bottom end portion of the fender panel. In the state in which the first engagement portion and the second engagement portion engage with the fender panel, the first engagement portion and the second engagement portion are biased in the vehicle height direction in which the engagement portions are separated from each other by an elastic restoring force of the spring portion that is disposed in the intermediate portion in the vehicle height direction of the reinforcing member. Accordingly, the first engagement portion and the second engagement portion are pressed against the top end portion and the bottom end portion of the fender panel, and positioning of the reinforcing member relative to the fender panel is maintained well. As a result, it is possible to reinforce a target portion of the fender panel.

In the fender structure for a vehicle according to the aspect, a reinforcing rib which extends in a vehicle length direction may be integrally formed at both ends in the vehicle height direction of the spring portion.

In the fender structure for a vehicle having the above-mentioned configuration, reinforcing members extending in the vehicle length direction are integrally formed at both ends in the vehicle height direction of the spring portion of the reinforcing member. Accordingly, it is possible to enhance rigidity of the reinforcing member and to further improve rigidity of the fender panel which is supported by the reinforcing member.

In the fender structure for a vehicle according to the aspect, the reinforcing member may be formed to fill a gap between the fender panel and a vehicle-body constituent member which is disposed on the inner side in the vehicle width direction of the fender panel and to which the fender panel is attached.

In the fender structure for a vehicle having the above-mentioned configuration, the reinforcing member is formed to fill a gap between the fender panel and the vehicle-body constituent member. Accordingly, running wind which is introduced from a grille of the vehicle-body front portion during travel comes in contact with the reinforcing member and turns back when the running wind flows out between the fender panel and the vehicle-body constituent member, and the running wind is likely to flow to the vehicle-body front portion. Accordingly, running wind is likely to flow downward through the vehicle-body front portion and it is possible to enhance the cooling capability of a power unit chamber which is disposed in the vehicle-body front portion.

In the fender structure for a vehicle according to the aspect, the spring portion may have a plate shape with a meandering curve when seen in the vehicle width direction and may be deformable in the vehicle height direction.

In the fender structure for a vehicle having the above-mentioned configuration, the spring portion has a plate shape with a meandering curve when seen in the vehicle width direction. Accordingly, for example, in comparison with a case in which a spring portion with a meandering curve when seen in the vehicle length direction is provided, it is possible to curb warping deformation of the reinforcing member with the spring portion as a starting point due to input of a load in the vehicle width direction. Accordingly, when the vehicle collides with something laterally, the fender panel can effectively obtain a reaction force from the reinforcing member and it is thus possible to curb deformation of the fender panel.

In the fender structure for a vehicle according to the aspect, the spring portion may include a closed-section portion that is rectangular when seen in the vehicle width direction, the closed-section portion may be formed to be symmetric with respect to a center line in the vehicle height direction of the reinforcing member, a diagonal of the closed-section portion may be disposed along the center line, and the spring portion may be deformable in the vehicle height direction.

In the spring portion of the fender structure for a vehicle having the above-mentioned configuration, the closed-section portion that is rectangular when seen in the vehicle width direction is formed to be elastically deformable in the vehicle height direction. The closed-section portion is formed to be symmetric with respect to the center line in the vehicle height direction of the reinforcing member, and the diagonal thereof is disposed along the center line. Accordingly, both sides in the vehicle width direction of the center line can be equally deformed. Accordingly, it is possible to improve stability when the reinforcing member is elastically deformed in the vehicle height direction and is assembled into the fender panel.

As described above, with the fender structure for a vehicle according to the aspect of the disclosure, it is possible to maintain positioning of the reinforcing member relative to the fender panel well and to reinforce a target portion of the fender panel.

With the fender structure for a vehicle having the above-mentioned configuration, it is possible to enhance rigidity of the fender panel which is supported by the reinforcing member.

With the fender structure for a vehicle having the above-mentioned configuration, it is possible to enhance the cooling capability of a power unit chamber which is disposed in the front part of the vehicle.

With the fender structure for a vehicle having the above-mentioned configuration, the fender panel can effectively obtain a reaction force from the reinforcing member and curb deformation of the fender panel when the vehicle collides with something laterally.

With the fender structure for a vehicle having the above-mentioned configuration, it is possible to improve stability when the reinforcing member is elastically deformed in the vehicle height direction and is assembled into the fender panel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7A is a perspective view illustrating a reinforcing member according to a modified example of the first embodiment and corresponding to FIG. 6;

FIG. 7B is a perspective view illustrating a reinforcing member according to a modified example of the first embodiment and corresponding to FIG. 6;

FIG. 7C is a perspective view illustrating a reinforcing member according to a modified example of the first embodiment and corresponding to FIG. 6;

DETAILED DESCRIPTION OF EMBODIMENTS

First Embodiment

Figure 1:
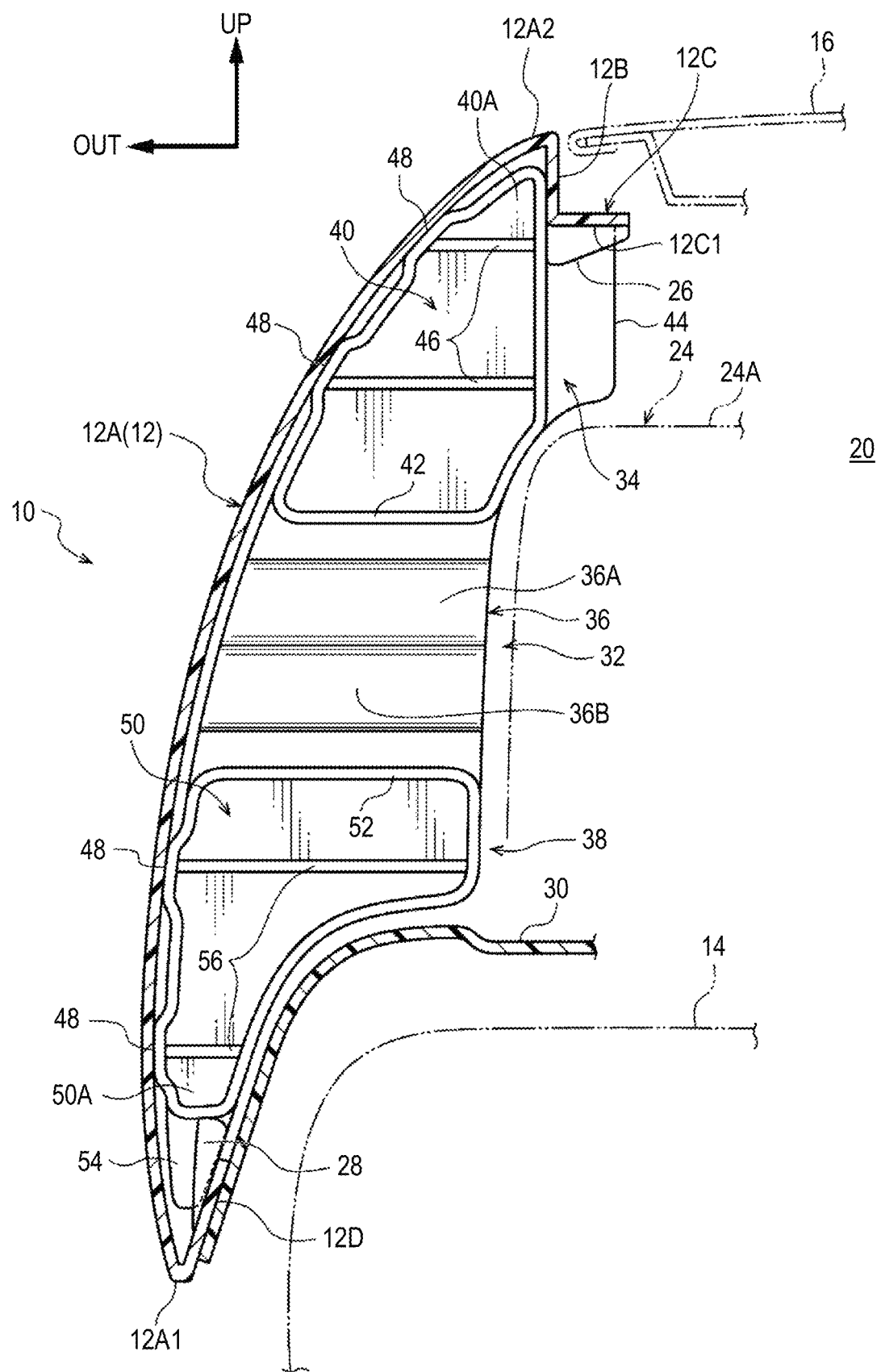
FIG. 1 is a longitudinal sectional view of an assembled state illustrating the entire configuration of a fender structure for a vehicle according to a first embodiment (a sectional view taken along line I-I in FIG. 3)

Hereinafter, a fender structure for a vehicle according to a first embodiment of the disclosure will be described with reference to FIGS. 1 to 7C. In the drawings, an arrow FR indicates a vehicle front side, an arrow UP indicates a vehicle upper side, and an arrow OUT indicates an outer side in a vehicle width direction. In the following description, when forward, rearward, upward, downward, rightward, and leftward directions are described, they are assumed to indicate forward and rearward in a vehicle length direction, upward and downward in a vehicle height direction, and rightward and leftward in a traveling direction unless mentioned otherwise.

Figure 2:
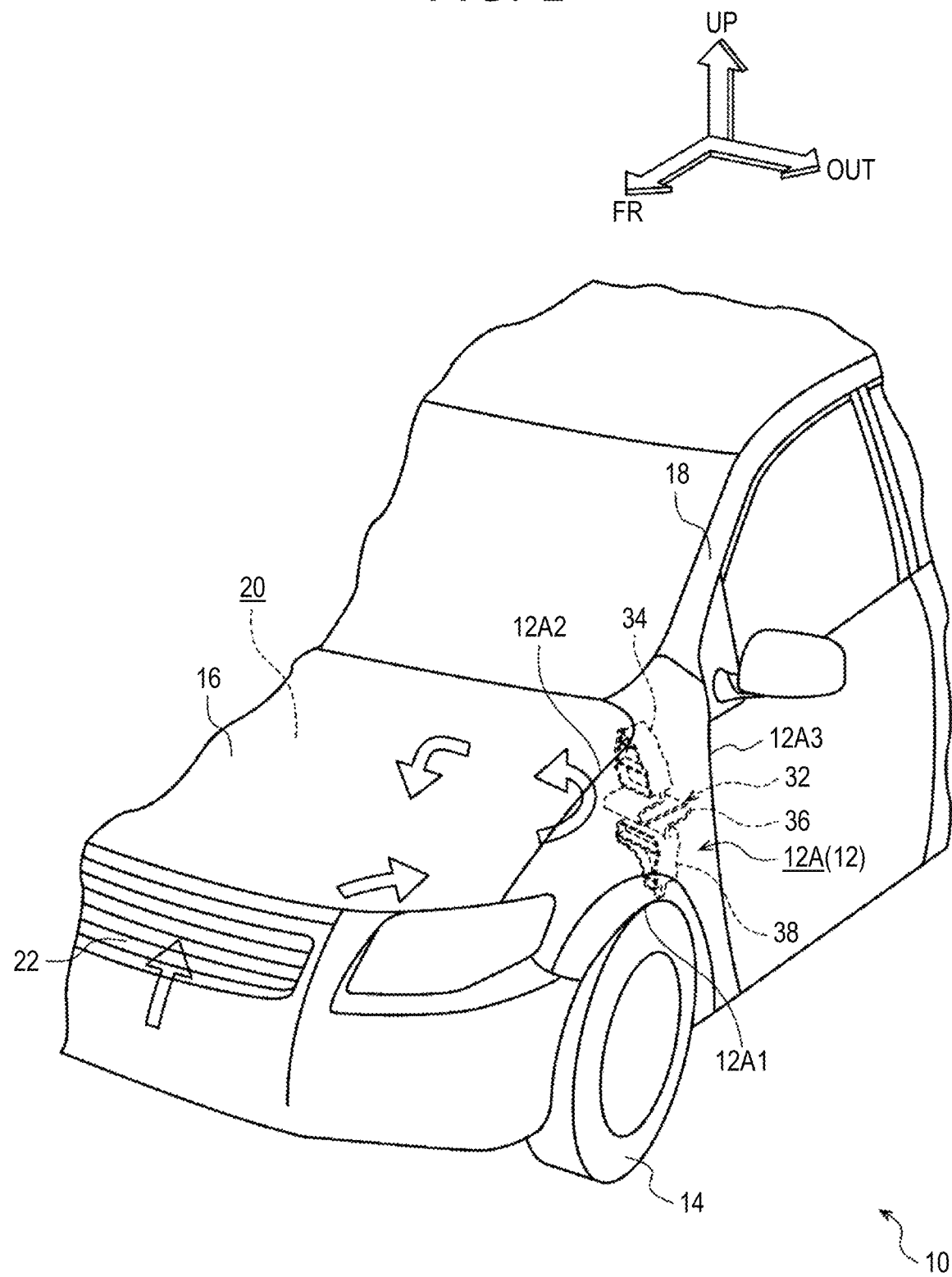
FIG. 2 is a perspective view illustrating a part of a vehicle to which the fender structure for a vehicle according to the first embodiment is applied.
Figure 3:
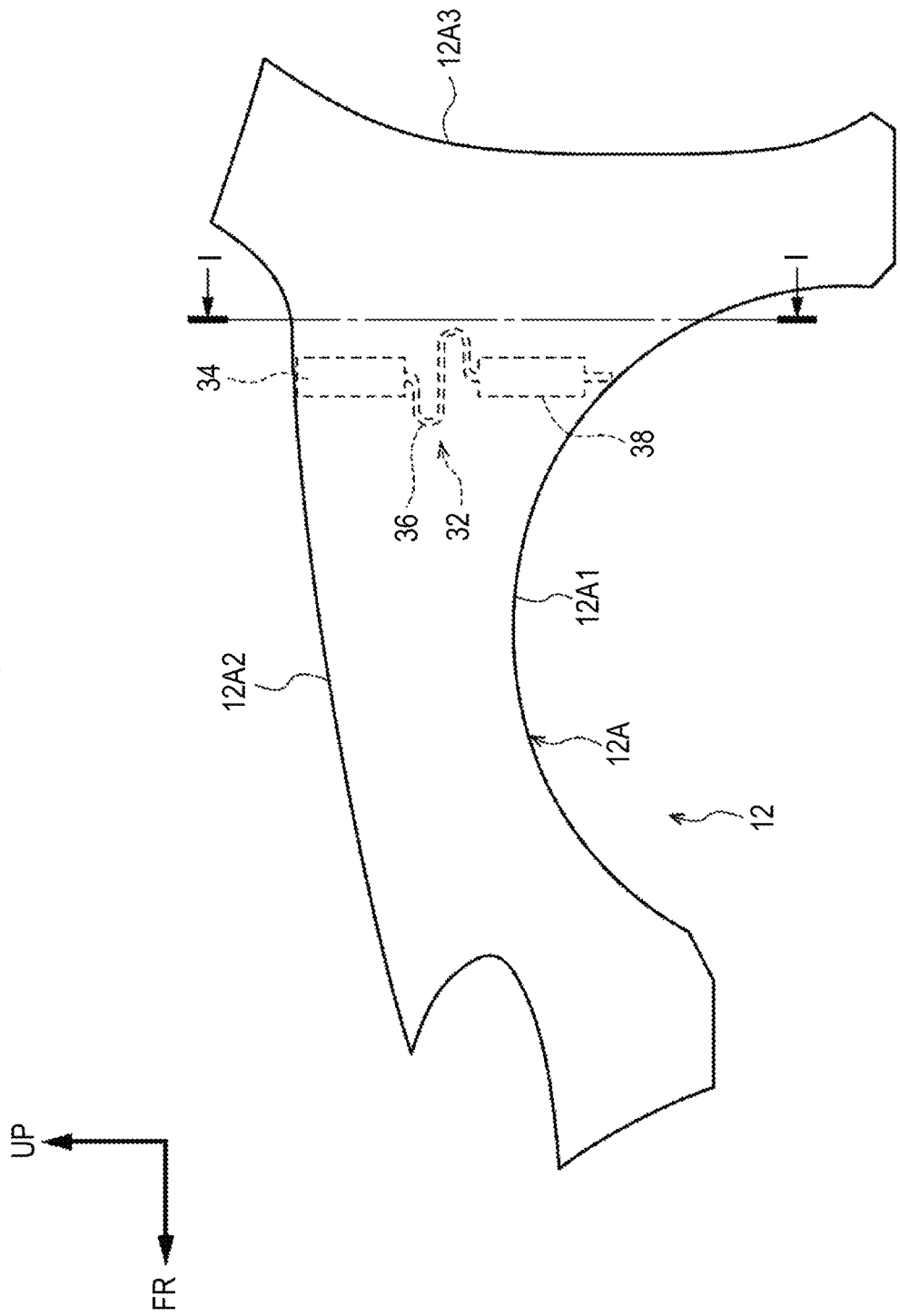
FIG. 3 is a side view of a fender panel illustrated in FIG. 2.

FIG. 2 is a perspective view illustrating a part of a vehicle 10 to which the fender structure for a vehicle according to this embodiment is applied when seen from the front-left side of the vehicle. FIG. 3 is a side view illustrating a front fender panel 12 illustrated in FIG. 2 when seen from the left side of the vehicle.

As illustrated in the drawings, a front fender panel 12 (hereinafter simply referred to as a "fender panel 12) formed of a resin is disposed on two side surfaces of the vehicle-body front portion of the vehicle 10. The fender panel 12 includes an outer vertical wall portion 12A which is disposed above a front wheel 14 and constitutes a decorative surface. The outer vertical wall portion 12A is formed in a plate shape and a bottom end portion 12A1 thereof has an arc shape along the front wheel 14. A top end portion 12A2 of the outer vertical wall portion 12A is disposed along the outer portion in the vehicle width direction of a hood 16 which constitutes a top surface of the vehicle-body front portion of the vehicle 10 and can open and close a power unit chamber 20. A rear end portion 12A3 of the outer vertical wall portion 12A is superimposed on the front portion of a front pillar 18 and an intermediate portion in the vehicle height direction from the outside.

FIG. 1 is a longitudinal sectional view illustrating an assembled state when the fender panel 12 illustrated in FIG. 3 is cut along line I-I when seen from a rear side of a vehicle. As illustrated in the drawing, the outer vertical wall portion 12A of the fender panel 12 is slowly curved to be convex to the outer side in the vehicle width direction. The top end portion of the fender panel 12 includes an inner vertical wall portion 12B which is bent and suspended down from the top end portion 12A2 of the outer vertical wall portion 12A and a fender attachment portion 12C which is bent horizontally to the power unit chamber 20 from a bottom end portion of the inner vertical wall portion 12B. A pair of first fixing ribs 26 which extend downward from a bottom face 12C1 of the fender attachment portion 12C and which are disposed with an interval in the vehicle length direction are integrally formed in the fender attachment portion 12C (see FIG. 5). A first engagement portion 44 that is disposed in the top end portion of a reinforcing member 32 which will be described later is inserted between the pair of first fixing ribs 26.

On the other hand, the bottom end portion of the fender panel 12 includes a folded portion 12D that extends from the bottom end portion 12A1 of the outer vertical wall portion 12A to the upper side and the inner side in the vehicle width direction. A pair of second fixing ribs 28 that rise to the outer side in the vehicle width direction and are disposed with an interval in the vehicle length direction are integrally formed in the outer surface in the vehicle width direction of the folded portion 12D (see FIG. 5). A second engagement portion 54 of the reinforcing member 32 which will be described later is inserted between the pair of second fixing ribs 28.

As illustrated in FIG. 1, an outer end portion in the vehicle width direction of a fender liner 30 is bonded to an inner surface in the vehicle width direction of the folded portion 12D. The fender liner 30 is formed of, for example, a resin and is formed as a plate member which is curved to cover the top of a wheel house (which has no reference numeral) in which the front wheel 14 is accommodated. Accordingly, rainwater scattering from the front wheel 14, sand on a road surface, or the like bounces back from the fender liner 30 during travel and the sand or the like is prevented from intruding between the fender panel 12 and the vehicle body.

An upper apron member 24 is disposed below the top end portion 12A2 of the outer vertical wall portion 12A in the fender panel 12. The upper apron member 24 is a vehicle body frame member having a long hollow shape which extends in the vehicle length direction. The upper apron member 24 is disposed on the outer side in the vehicle width direction and the upper side of a pair of front side members (not illustrated) which extend in the vehicle length direction on both ends in the vehicle width direction of the vehicle 10. A front end portion of the upper apron member 24 is connected to the front side members via a connection member (not illustrated), and a rear end portion of the upper apron member 24 is connected to a front portion and an intermediate portion in the vehicle height direction of the front pillar 18. The upper apron member 24 and the fender liner 30 correspond to a "vehicle-body constituent member" in the claims.

In the fender structure for a vehicle according to this embodiment, a plurality of brackets (not illustrated) which are arranged at predetermined intervals in the vehicle length direction (a length direction of the upper apron member 24) are suspended between the fender attachment portion 12C of the fender panel 12 and a top surface 24A of the upper apron member 24. Accordingly, the top end portion of the fender panel 12 is supported by the upper apron member 24 serving as a vehicle-body constituent member with the brackets interposed therebetween.

The reinforcing member 32 which is a principal element in this embodiment will be described below in detail.

Figure 4:
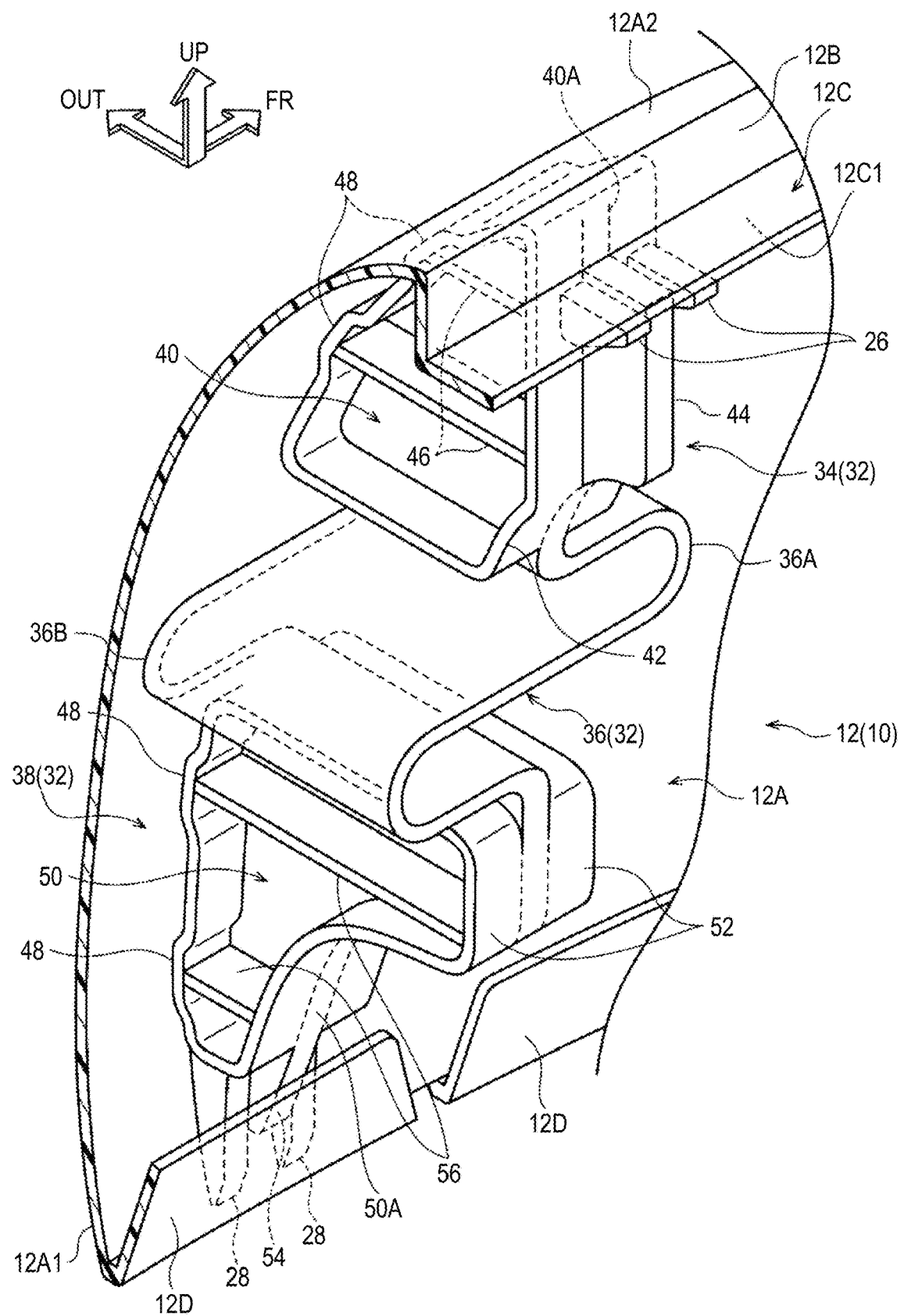
FIG. 4 is a partial perspective view illustrating an assembled state of the fender structure for a vehicle illustrated in FIG. 1 when seen from the inside of the fender panel in a vehicle width direction.

As illustrated in FIGS. 1 to 6, the reinforcing member 32 is disposed on the inner side in the vehicle width direction of the fender panel 12 and extends in the vehicle height direction and the vehicle width direction. The reinforcing member 32 of this embodiment is formed of a resin. In FIG. 4, the fender liner 30 is not illustrated for the purpose of convenience of description.

Structurally, the reinforcing member 32 includes a first body portion 34 that constitutes an upper portion of the reinforcing member 32, a spring portion 36 that constitutes an intermediate portion of the reinforcing member 32, and a second body portion 38 that constitutes a lower portion of the reinforcing member 32 as principal portions in an assembled state.

First Body Portion 34

The first body portion 34 includes a panel-shaped base portion 40, a circumferential wall portion 42 that rises from an edge of the base portion 40, a first engagement portion 44 that is disposed in an inner end portion in the vehicle width direction of the base portion 40. The first body portion 34 includes a reinforcing rib 46 that rises in the vehicle length direction from a flat portion of the base portion 40. The base portion 40 is formed in a flat panel shape and extends in the vehicle height direction with the vehicle length direction as a thickness direction. The base portion 40 has a triangular shape when seen in the vehicle length direction and tapers upward. In the assembled state of the reinforcing member, the top end portion 40A of the base portion 40 is inserted between the outer vertical wall portion 12A and the inner vertical wall portion 12B which constitute the top end portion of the fender panel 12. Accordingly, the first body portion 34 is positioned relative to the fender panel 12 in the vehicle width direction.

The outer portion in the vehicle width direction of the base portion 40 has a shape corresponding to the upper portion of the outer vertical wall portion 12A in the fender panel 12 in the assembled state and has a shape which is slowly curved to be convex to the outer side in the vehicle width direction. A plurality of (two in this embodiment) contact portions 48 that are convex to the outer side in the vehicle width direction are formed in the vehicle height direction in the outer portion in the vehicle width direction of the base portion 40. The contact portions 48 come in contact with the inner surface in the vehicle width direction of the outer vertical wall portion 12A in the assembled state. Accordingly, the upper portion of the fender panel 12 is supported from the inner side in the vehicle width direction by the first body portion 34, and thus surface rigidity (tensile rigidity) of the fender panel 12 is increased.

On the other hand, the upper portion of the inner portion in the vehicle width direction of the base portion 40 is bent and suspended down from the top end portion 40A of the base portion 40. The lower portion of the inner portion in the vehicle width direction of the base portion 40 has a shape corresponding to the outer shape of the upper apron member 24 which is disposed on the inner side in the vehicle width direction and the lower side of the first body portion 34.

The first engagement portion 44 is formed on the inner side in the vehicle width direction of the top end portion 40A of the base portion 40. The first engagement portion 44 rises inward in the vehicle width direction from the base portion 40 and has a panel shape which is long in the vehicle height direction. As illustrated in FIG. 4, in the assembled state of the reinforcing member 32, the first engagement portion 44 is inserted between the pair of first fixing ribs 26 which are formed in the top end portion of the fender panel 12. Accordingly, the first body portion 34 is positioned in the vehicle length direction relative to the fender panel 12. The top end portion of the first engagement portion 44 is pressed against the bottom surface of the fender attachment portion 12C by an elastic restoring force of the spring portion 36 which will be described later. Accordingly, the first body portion 34 is positioned in the vehicle height direction relative to the fender panel 12.

Figure 6:
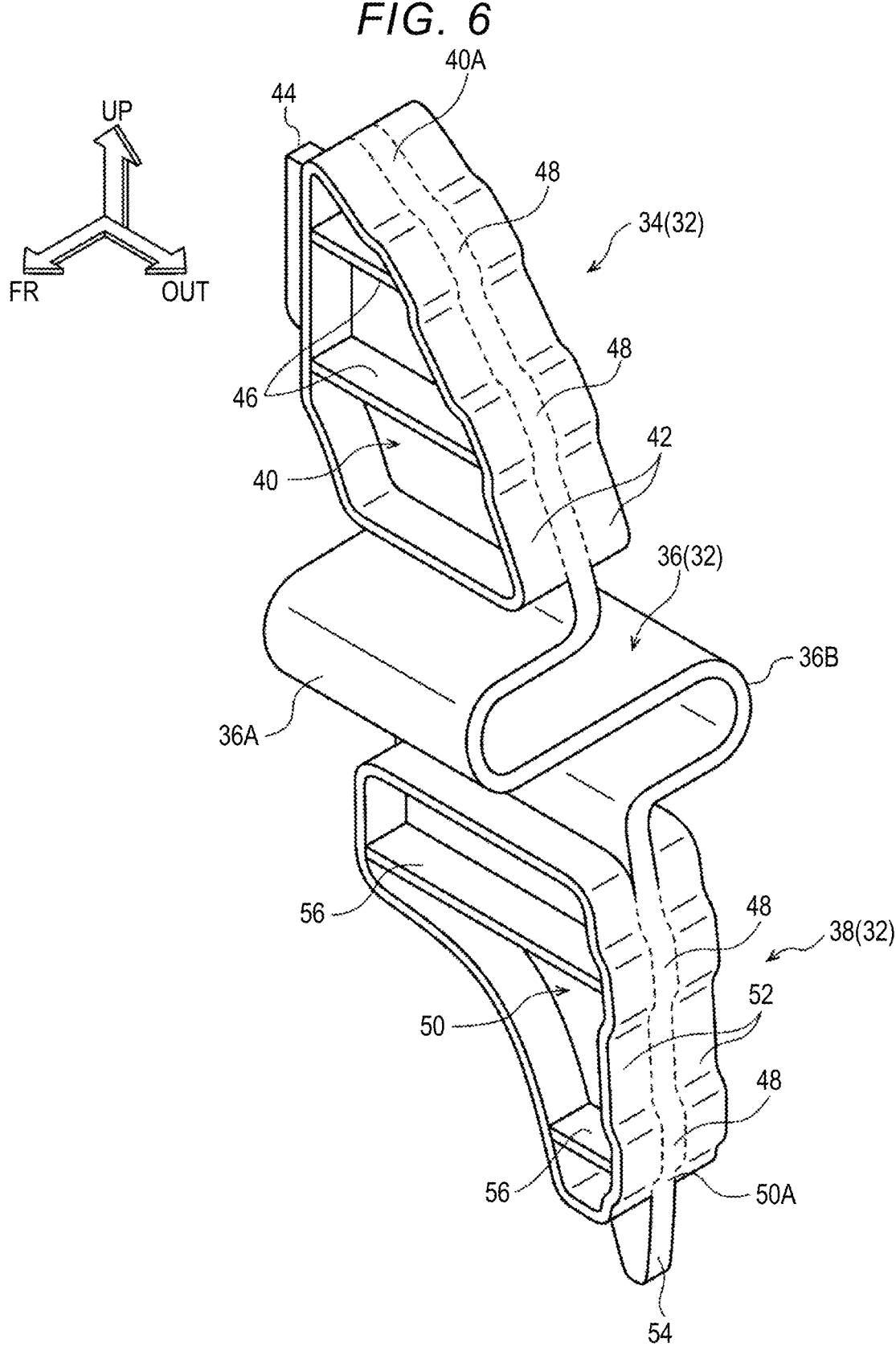
FIG. 6 is a perspective view illustrating a reinforcing member illustrated in FIG. 1.

As illustrated in FIG. 6, the circumferential wall portions 42 which rise on both sides in the vehicle length direction to cover an edge of the base portion 40 are integrally formed in the edge of the base portion 40 and stabilize a contact surface between the first body portion 34 and the fender panel 12. The circumferential wall portions 42 constitute a triangular closed-section portion when seen in the vehicle length direction.

The reinforcing ribs 46 are integrally formed with the flat portion on both sides in the vehicle length direction of the base portion 40 and rise in the vehicle length direction from both sides in the vehicle length direction of the base portion 40. Accordingly, surface rigidity of the base portion 40 is increased. The reinforcing ribs 46 are disposed to cross the inside of the closed-section portion formed by the circumferential wall portion 42 in the vehicle width direction, and a plurality of (two in this embodiment) reinforcing ribs are arranged with an interval in the vehicle height direction. The reinforcing ribs 46 are disposed at positions overlapping the contact portions 48 which are formed on the outer side in the vehicle width direction of the base portion 40. Accordingly, a load which is transmitted from the fender panel 12 to the reinforcing member 32 via the contact portions 48 is efficiently transmitted to the reinforcing ribs 46.

Spring portion 36

Figure 5:
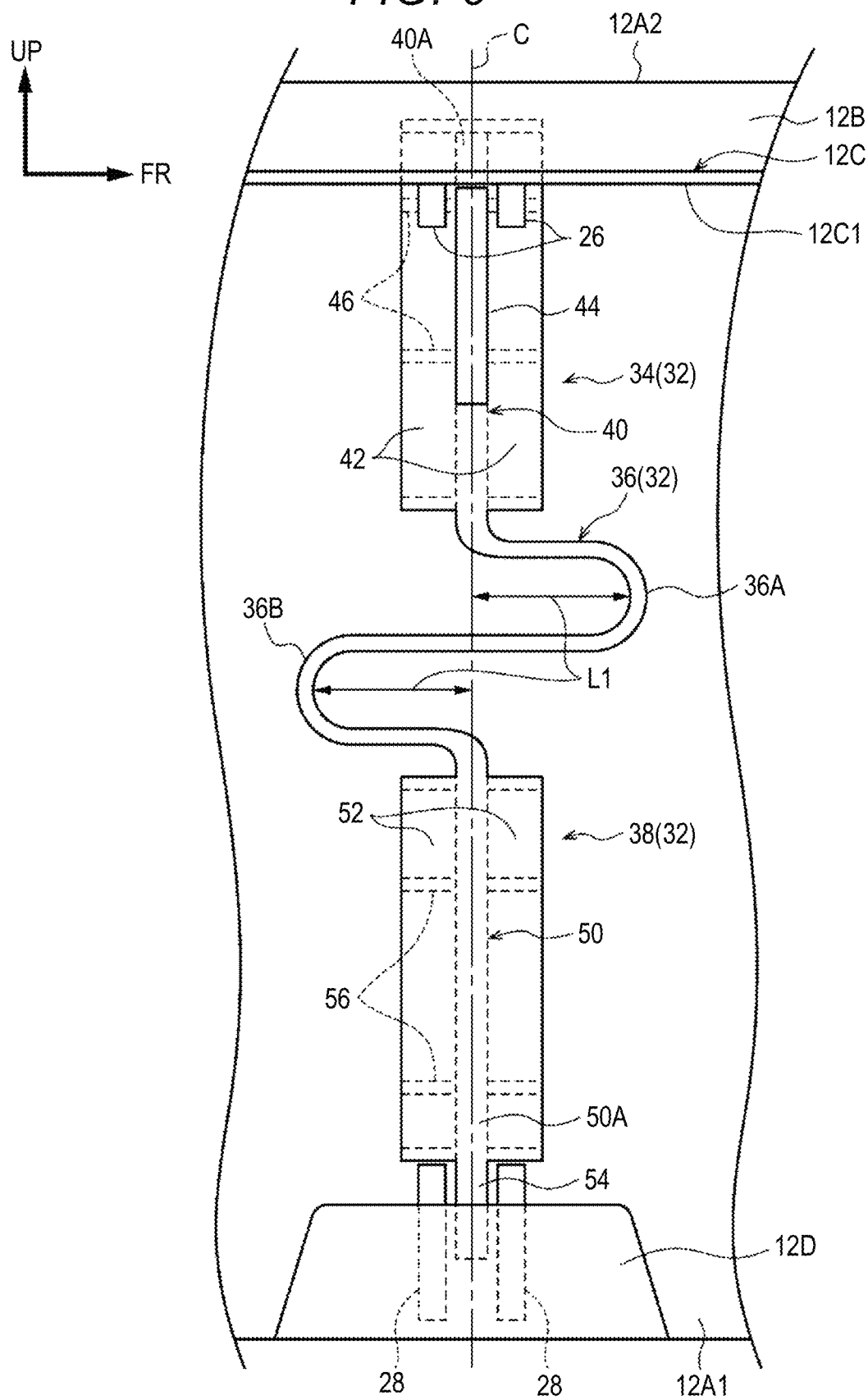
FIG. 5 is a partial side view illustrating an assembled state of the fender structure for a vehicle illustrated in FIG. 1 when seen from the inside of the fender panel in a vehicle width direction.

FIG. 5 is a side view of the reinforcing member 32 according to this embodiment when seen from the inner side in the vehicle width direction. A center line C parallel to the length direction of the reinforcing member (the vehicle height direction) is illustrated in FIG. 5.

As illustrated in the drawing, a plate-shaped spring portion 36 is provided in an intermediate portion of the reinforcing member 32 and is integrally formed with the first body portion 34 and the second body portion 38 which are disposed at both ends in the vehicle height direction of the spring portion 36. The spring portion 36 extends downward while meandering along the center line C of the reinforcing member 32 from the bottom end portion of the base portion 40. Specifically, the spring portion 36 extends from the bottom end portion of the base portion 40 along the center line C, then extends to the front side of the vehicle by a predetermined length L1, and is then folded back to the rear side of the vehicle in a first bent portion 36A. Then, the spring portion 36 extends to the rear side of the vehicle by a predetermined length L1 from the center line C, is folded back in a second bent portion 36B, extends to the front side of the vehicle again, and extends downward along the center line C. The spring portion 36 is formed in a shape that is substantially rectangular when seen in the vehicle length direction, the outer portion in the vehicle width direction has a shape corresponding to the intermediate portion of the fender panel 12, and the inner portion in the vehicle width direction has a shape corresponding to the outer shape of the upper apron member 24.

When an external force along the center line C is applied to the spring portion 36, the spring portion 36 having the above-mentioned configuration is deformed with the first bent portion 36A and the second bent portion 36B disposed on both sides in the vehicle length direction with respect to the center line C as starting points and is elastically deformed to contract or stretch in the vehicle height direction.

Second Body Portion 38

The second body portion 38 is provided below the spring portion 36. The second body portion 38 has the same basic elements as the first body portion 34 and includes a panel-shaped base portion 50 and a circumferential wall portion 52 that rises from the edge of the base portion 50. The second body portion 38 includes a second engagement portion 54 that is disposed in a bottom end portion 50A of the base portion 50 and reinforcing ribs 56 that rise in the vehicle length direction from the flat portion of the base portion 50.

The base portion 50 is formed in a flat panel shape and extends in the vehicle height direction with the vehicle length direction as a thickness direction thereof.

The base portion 50 has an inverted triangular shape when seen in the vehicle length direction and tapers downward.

The outer portion in the vehicle width direction of the base portion 50 has a shape corresponding to the lower portion of the outer vertical wall portion 12A in the fender panel 12 in the assembled state and has a shape which is slowly curved to be convex to the outer side in the vehicle width direction. A plurality of (two in this embodiment) contact portions 48 that are the same as in the first body portion 34 are formed in the vehicle height direction in the outer portion in the vehicle width direction of the base portion 50. Accordingly, the lower portion of the fender panel 12 is supported from the inner side in the vehicle width direction by the second body portion 38. On the other hand, the upper portion of the inner portion in the vehicle width direction of the base portion 50 has a shape corresponding to the outer shape of the upper apron member 24 which is disposed on the inner side in the vehicle width direction of the second body portion 38. The lower portion of the inner portion in the vehicle width direction of the base portion 50 has a shape which is curved to be convex to the outer side in the vehicle width direction such that it corresponds to the outer shape of the fender liner 30 disposed on the inner side in the vehicle width direction of the second body portion 38 and on the lower side thereof (see FIG. 1).

As illustrated in FIGS. 5 and 6, the second engagement portion 54 is formed in a bottom end portion 50A of the base portion 50. The second engagement portion 54 rises downward from the bottom end portion 50A of the base portion 50 and has a panel shape which is long in the vehicle height direction. As illustrated in FIG. 4, in the assembled state of the reinforcing member 32, the second engagement portion 54 is inserted between a pair of second fixing ribs 28 formed between the bottom end portion 12A1 of the outer vertical wall portion 12A of the fender panel 12 and the folded portion 12D. Accordingly, the second body portion 38 is positioned in the vehicle width direction and the vehicle length direction relative to the fender panel 12. The bottom end portion (the bottom end portion 50A) of the second body portion 38 is pressed against the top end portions of the pair of second fixing ribs 28 by the elastic restoring force of the spring portion 36. Accordingly, the second body portion 38 is positioned in the vehicle height direction relative to the fender panel 12. The first fixing ribs 26 and the second fixing ribs 28 are arranged along the center line C of the reinforcing member 32.

the circumferential wall portion 52 that rises to both sides in the vehicle length direction is integrally formed with the edge of the base portion 50 so as to surround the edge. The circumferential wall portion 52 constitutes an inverted triangular closed-section portion when seen in the vehicle length direction. The reinforcing ribs 56 extending to both sides in the vehicle length direction from the flat portion are formed in the flat portion of the base portion 50. The circumferential wall portion 52 and the reinforcing ribs 56 have the same configuration as the circumferential wall portion 42 and the reinforcing ribs 46 and thus description thereof will not be repeated.

As illustrated in FIG. 1, the reinforcing member 32 having the above-mentioned configuration is formed to fill a gap between the fender panel 12 and the upper apron member 24 when seen in the vehicle length direction. Accordingly, when a load is input from a lateral side of the vehicle to the fender panel 12 at the time of collision of the vehicle and the fender panel 12 is deformed to the inner side in the vehicle width direction, a reaction force can be rapidly obtained from the upper apron member 24 via the reinforcing member 32. The base portions 40, 50 and the reinforcing ribs 46, 56 which are formed in the reinforcing member 32 are crushed to absorb impact energy.

The reinforcing member 32 according to this embodiment has a function of a sealing member that seals a gap which is formed between the fender panel 12 and a vehicle-body constituent member such as the upper apron member 24 and the fender liner 30. Accordingly, it is possible to improve the cooling capability of the power unit chamber 20 due to running wind which is introduced from the vehicle-body front portion during travel.

Supplementarily, as illustrated in FIG. 2, a part of running wind (see decolored arrows in FIG. 2) which is introduced from a grille 22 disposed in the vehicle-body front portion of the vehicle 10 during travel is likely to pass between the fender panel 12 and the upper apron member 24 and the fender liner 30. In this embodiment, the running wind comes in contact with the reinforcing member 32, turns back, and is introduced into the power unit chamber 20 side. Accordingly, since an air volume which is introduced from the grille 22 and flows out downward from the vehicle via the power unit chamber 20 increases, the cooling capability of the power unit chamber 20 is improved.

An assembly operation of the above-mentioned fender structure for a vehicle is performed by first assembling the reinforcing member 32 into the fender panel 12 and then attaching the fender panel 12 to the vehicle 10. Assembly of the reinforcing member 32 into the fender panel 12 is performed while elastically deforming the spring portion 36 of the reinforcing member 32 to be reduced in the vehicle height direction.

Specifically, an operator first fits one of the top end portion and the bottom end portion of the reinforcing member 32 to the corresponding top end portion or bottom end portion of the fender panel 12, reduces the spring portion 36 by elastically deforming the spring portion 36 while gripping the other end portion of the reinforcing member 32, and fits the other end portion to the top end portion or the bottom end portion of the fender panel 12. In this way, the operation of assembling the reinforcing member 32 into the fender panel 12 is completed.

In this state, the first engagement portion 44 of the first body portion 34 is fitted to a pair of first fixing ribs 26 which are formed in the top end portion of the fender panel 12. The second engagement portion 54 of the second body portion 38 is inserted into a pair of second fixing rib 28 which are formed in the bottom end portion of the fender panel 12. When the spring portion 36 of the reinforcing member 32 is elastically restored, the first engagement portion 44 and the second engagement portion 54 are biased in the vehicle height direction in which the two engagement portions are separated from each other.

Operations and advantages of this embodiment will be described below.

In the fender structure for a vehicle according to this embodiment, the fender panel 12 is reinforced by the reinforcing member 32 that supports the fender panel 12 from the inner side in the vehicle width direction. The first engagement portion 44 is provided in the top end portion of the reinforcing member 32, the second engagement portion 54 is provided in the bottom end portion thereof, and the first and second engagement portions are able to engage with the top end portion and the bottom end portion of the fender panel 12. In the state in which the first engagement portion 44 and the second engagement portion 54 engage with the fender panel 12, the first engagement portion 44 and the second engagement portion 54 are biased in the vehicle height direction in which the two engagement portions are separated from each other by the elastic restoring force of the spring portion 36 which is provided in the intermediate portion in the vehicle height direction of the reinforcing member 32. Accordingly, the first engagement portion 44 and the second engagement portion 54 are pressed against the top end portion and the bottom end portion of the fender panel 12, and positioning of the reinforcing member 32 relative to the fender panel 12 is maintained well. As a result, it is possible to reinforce a target portion of the fender panel.

In this embodiment, the reinforcing ribs 46, 56 extending in the vehicle length direction are formed integrally with both end portions in the vehicle height direction of the spring portion 36 of the reinforcing member 32. Accordingly, rigidity of the first body portion 34 and the second body portion 38 constituting the reinforcing member 32 is increased. As a result, it is possible to further improve surface rigidity (tensile rigidity) of the fender panel 12 which is supported by the reinforcing member 32.

In this embodiment, the reinforcing member 32 is formed to fill the gap between the fender panel 12 and the upper apron member 24. Accordingly, running wind which is introduced from the grille 22 of the vehicle-body front portion of the vehicle 10 during travel comes in contact with the reinforcing member 32 and turns back when the running wind flows out between the fender panel 12 and the upper apron member 24, and the running wind is likely to flow to the vehicle-body front portion. Accordingly, the running wind is likely to flow downward through the vehicle-body front portion and it is possible to enhance the cooling capability of the power unit chamber 20 which is disposed in the vehicle-body front portion.

In this embodiment, the spring portion 36 which is disposed in the intermediate portion of the reinforcing member 32 has a plate shape with a meandering curve when seen in the vehicle width direction. Accordingly, for example, in comparison with a case in which a spring portion with a meandering curve when seen in the vehicle length direction is provided, it is possible to curb warping deformation of the reinforcing member 32 with the spring portion 36 as a starting point due to input of a load in the vehicle width direction. Accordingly, when the vehicle collides with something laterally, the fender panel 12 can effectively obtain a reaction force from the reinforcing member 32 and it is thus possible to curb deformation of the fender panel 12.

The spring portion 36 is elastically deformable in the vehicle height direction. Accordingly, even when rainwater, sand on a road surface, or the like comes in contact with the fender liner 30 and vibration is transmitted to the bottom end portion of the fender panel 12, it is possible to curb amplification of the vibration by the spring portion 36. Accordingly, since noise or vibration is not likely to be transmitted from the fender panel 12 to a passenger compartment via the vehicle body, it is possible to enhance soundproofing and vibration proofing effects in the passenger compartment In this embodiment, the reinforcing member 32 and the fender panel 12 come in contact with each other at a plurality of contact portions 48 which are provided in the outer portion in the vehicle width direction of the reinforcing member 32. Accordingly, in comparison with a case in which a reinforcing member in which the whole outer portion in the vehicle width direction comes in contact with the inner surface in the vehicle width direction of the fender panel is employed, it is possible to perform assembly while absorbing unevenness at the time of manufacturing each member.

In this embodiment, the reinforcing ribs 46, 56 which are formed in the base portion 40 of the first body portion 34 and the base portion 50 of the second body portion 38 are disposed at positions overlapping the contact portions 48 which are formed in the outer portions in the vehicle width direction of the base portions 40, 50. Accordingly, a load input to the fender panel 12 can be efficiently transmitted to the base portions 40, 50 and the reinforcing ribs 46, 56 of the reinforcing member 32. As a result, it is possible to further improve surface rigidity (tensile rigidity) of the fender panel.

In this embodiment, the rigidity of the fender panel 12 is improved by assembling the reinforcing member 32 into the inner side in the vehicle width direction of the fender panel 12 formed of a resin. Accordingly, in comparison with a configuration in which reinforcing ribs are integrally formed with the inner surface in the vehicle width direction of the fender panel, it is possible to enhance a degree of freedom in design and rigidity of the fender panel 12. That is, when reinforcing ribs are integrally formed with the fender panel formed of a resin, the thickness of the ribs can be increased for the purpose of improvement in rigidity of the fender panel, but there is concern that sink marks may be formed in the decorative surface of the fender panel due to an increase in thickness. Accordingly, in the configuration in which the reinforcing ribs are integrally formed with the fender panel, there is a limit in design in terms of at least one of design and rigidity. On the other hand, in this embodiment, since the rigidity of the fender panel 12 can be improved by the reinforcing member 32 which is separately assembled into the fender panel 12, it is possible to enhance a degree of freedom in design and rigidity of the fender panel 12.

In this embodiment, since the fender panel 12 and the reinforcing member 32 are both formed of a resin, it is possible to achieve securement of rigidity of the fender panel 12 and a decrease in weight of the fender panel 12 in comparison with a case in which they are formed of iron or steel.

In this embodiment, the operation of assembling the reinforcing member 32 can be performed in advance before the fender panel 12 is assembled into the vehicle body. Accordingly, in comparison with a case in which a fender structure for a vehicle in which a reinforcing member is assembled after the fender panel has been assembled into the vehicle body, it is possible to improve workability for assembling the reinforcing member 32 and to accurately position the reinforcing member at the time of assembly.

Second Embodiment

Figure 8:
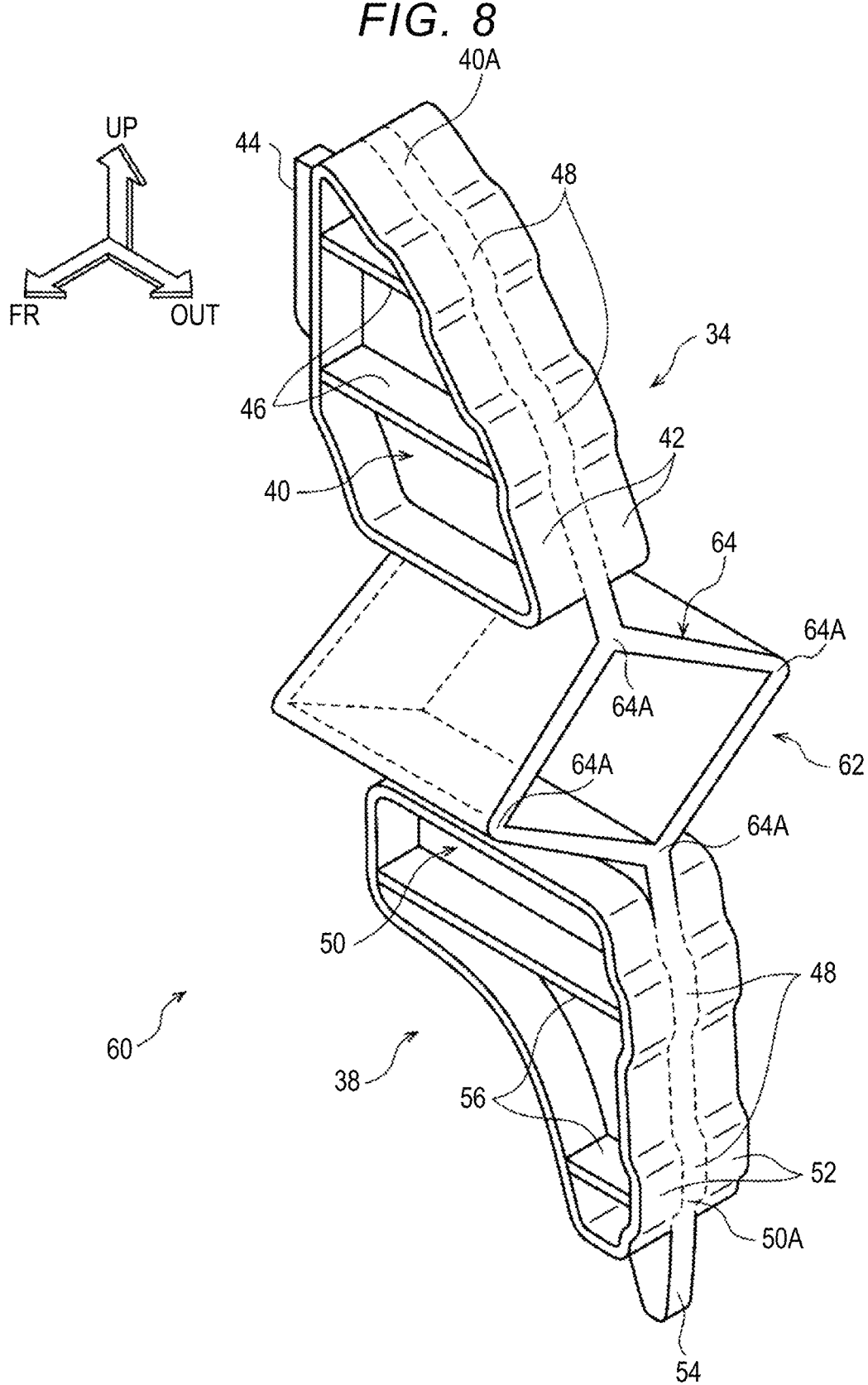
FIG. 8 is a perspective view illustrating a reinforcing member according to a second embodiment and corresponding to FIG. 6.

A fender structure for a vehicle according to a second embodiment of the disclosure will be described now with reference to FIGS. 8 and 9. The same elements as in the first embodiment will be referred to by the same reference signs and description thereof will not be repeated. As illustrated in the drawings, the fender structure for a vehicle according to the second embodiment is characterized in that a spring portion 62 of a reinforcing member 60 includes a closed-section portion 64 that is rectangular when seen in the vehicle width direction.

The spring portion 62 in this embodiment is formed of a resin similarly to the first embodiment, and constitutes an intermediate portion of the reinforcing member 60. A top end portion and a bottom end portion of the spring portion 62 are connected to the bottom end portion of the first body portion 34 and the top end portion of the second body portion 38. The spring portion 62 is formed in a substantially rectangular shape when seen in the vehicle length direction and is formed to fill a gap between the intermediate portion of the fender panel 12 and the upper apron member 24 similarly to the spring portion 36 in the first embodiment.

Figure 9:
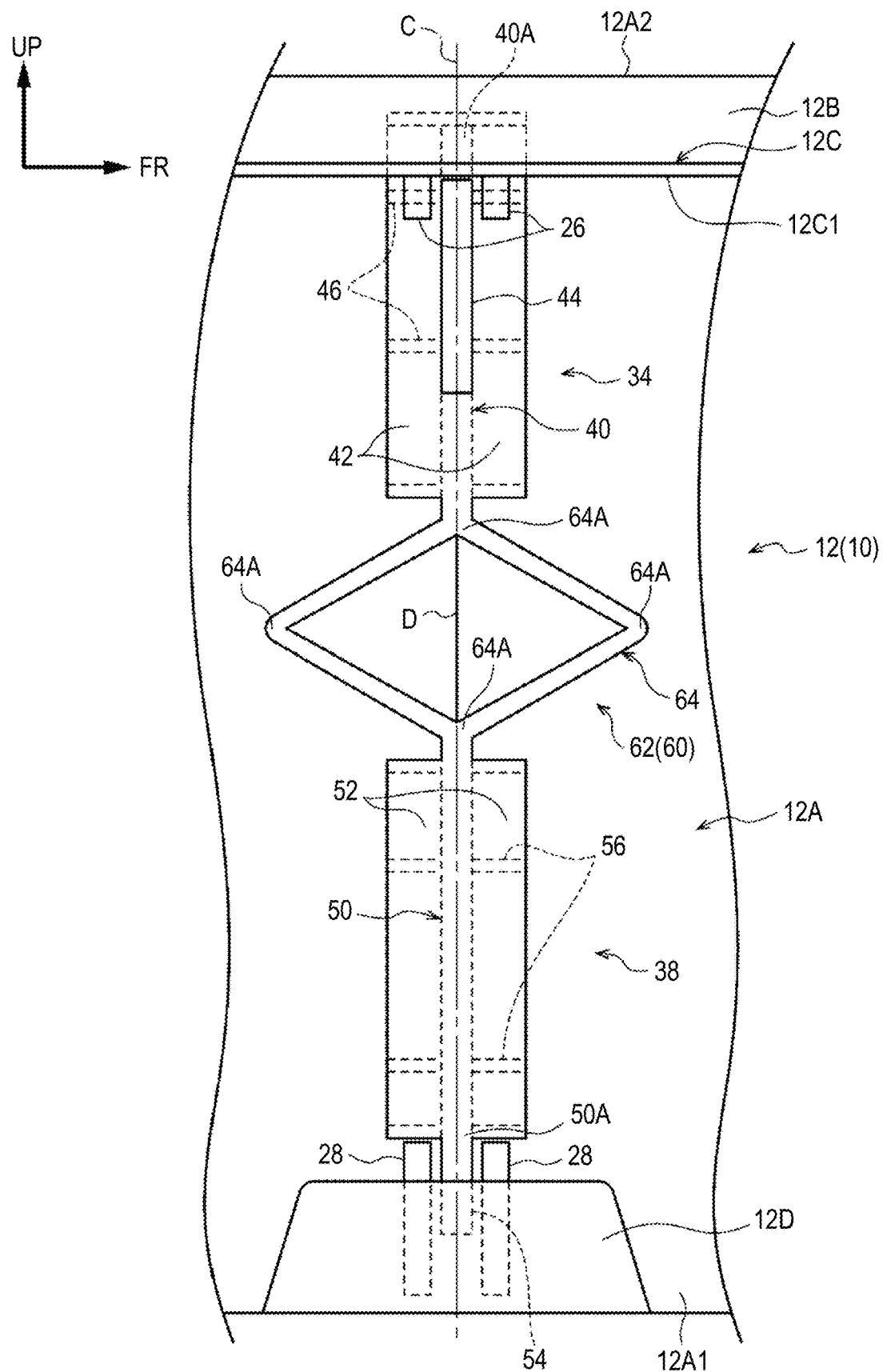
FIG. 9 is a side view illustrating an assembled state of a fender structure for a vehicle according to the second embodiment and corresponding to FIG. 5.

As illustrated in FIG. 9, the spring portion 62 includes a closed-section portion 64 that is rectangular when seen in the vehicle width direction. The closed-section portion 64 is formed to be symmetric with respect to a center line C of the reinforcing member 60 parallel to the vehicle height direction and a diagonal D (see FIG. 9) is disposed along the center line C. That is, corners 64A are disposed at both ends in the vehicle height direction and both ends in the vehicle length direction.

When an external force is applied to the closed-section portion 64 along the center line C, the spring portion 62 having the above-mentioned configuration warps with the corners 64A disposed at both ends in the vehicle length direction of the center line C as starting points and is elastically deformed to contract or stretch in the vehicle height direction. Accordingly, similarly to the spring portion 36 in the first embodiment, the reinforcing member 60 is assembled into the fender panel 12 in a state in which the closed-section portion 64 is elastically deformed to reduce in the vehicle height direction. In the state in which the reinforcing member 60 is assembled into the fender panel 12, the closed-section portion 64 is elastically restored in a direction in which it stretches in the vehicle height direction and biases the first engagement portion 44 of the first body portion 34 and the second engagement portion 54 of the second body portion 38 in a direction in which the two engagement portions are separated from each other.

Operations and Advantages

In this embodiment, since the configuration of the first embodiment is basically employed, the same operations and advantages are obtained.

In the reinforcing member 60 according to this embodiment, the closed-section portion 64 constituting the spring portion 62 is elastically deformable in the vehicle height direction. The closed-section portion 64 is formed to be symmetric with respect to the center line C of the reinforcing member 60 parallel to the vehicle height direction and the diagonal D is disposed along the center line C. Accordingly, both sides in the vehicle width direction of the center line C can be evenly elastically deformed. Accordingly, it is possible to improve stability when the reinforcing member 32 is elastically deformed in the vehicle height direction and is assembled into the fender panel 12.

Supplementary Description

In the first embodiment, the reinforcing ribs 46, 56 and the circumferential wall portions 42, 52 are provided on both sides in the vehicle height direction of the spring portion 36, but the disclosure is not limited thereto. As in a reinforcing member 70 illustrated in FIG. 7A, a configuration in which the reinforcing ribs 46, 56 and the circumferential wall portions 42, 52 are not provided may be employed.

Alternatively, as in a reinforcing member 80 illustrated in FIG. 7B, a configuration in which the reinforcing ribs 46, 56 are not provided on both sides in the vehicle height direction of the spring portion 36 and the circumferential wall portions 42, 52 are provided may be employed.

As in a reinforcing member 90 illustrated in FIG. 7C, a configuration in which the circumferential wall portions 42, 52 are not provided on both sides in the vehicle height direction of the spring portion 36 and the reinforcing ribs 46, 56 are provided may be employed. In the reinforcing members 70, 80, 90, the same spring portion 62 as in the second embodiment may be employed instead of the spring portion 36.

In the first embodiment and the second embodiment, the fender panel 12 and the reinforcing member 32 or 60 come in contact with each other via the contact portions 48 which are provided in the outer portion in the vehicle width direction of the reinforcing member 32 or 60, but the disclosure is not limited thereto. For example, a configuration in which the entire outer portion in the vehicle width direction of the reinforcing member comes in contact with the fender panel 12 may be employed. Alternatively, a configuration in which the entire outer portion in the vehicle width direction except the spring portion of the reinforcing member comes in contact with the fender panel 12 may be employed.

In the first embodiment and the second embodiment, the first engagement portion 44 and the second engagement portion 54 which are formed in a panel shape which is long in the vehicle height direction are provided in the top end portion and the bottom end portion of the reinforcing member 32 or 60 and a pair of first fixing ribs 26 and a pair of second fixing ribs 28 are provided on the fender panel side. However, the disclosure is not limited thereto, and a configuration in which a pair of ribs is provided in each of the top end portion and the bottom end portion of the reinforcing member and a plate member inserted between the pair of ribs is provided in the top end portion and the bottom end portion of the fender panel and is fitted to the pair of ribs may be employed.

In the first embodiment and the second embodiment, the fender panel 12 is formed of a resin, but the disclosure is not limited thereto and the fender panel may be formed of a metal such as steel, iron, or an aluminum alloy. Similarly, the reinforcing member 32 is not limited to the resin, and may be formed of a metal.

The spring portion 36 in the first embodiment has a shape with a meandering curve when seen in the vehicle width direction, but the disclosure is not limited thereto and the spring portion 36 may have a shape with a meandering curve when seen in the vehicle length direction.

The above-mentioned embodiments and the above-mentioned modified examples can be appropriately combined and implemented.

What is claimed is:

1. A fender structure for a vehicle, comprising:
    a fender panel that is disposed on a lateral surface of a vehicle-body front portion;
    a reinforcing member that is disposed on an inner side in a vehicle width direction of the fender panel, extends in a vehicle height direction and the vehicle width direction, and supports the fender panel from the inner side in the vehicle width direction;
    a first engagement portion that is disposed in a top end portion of the reinforcing member and is able to engage with a top end portion of the fender panel;
    a second engagement portion that is disposed in a bottom end portion of the reinforcing member and is able to engage with a bottom end portion of the fender panel; and
    a spring portion that is disposed in an intermediate portion in the vehicle height direction of the reinforcing member and biases the first engagement portion and the second engagement portion with an elastic restoring force in the vehicle height direction in which the first engagement portion and the second engagement portion are separated from each other in a state in which the first engagement portion and the second engagement portion engage with the top end portion and the bottom end portion of the fender panel.

2. The fender structure for a vehicle according to claim 1, wherein a reinforcing rib which extends in a vehicle length direction is integrally formed at both ends in the vehicle height direction of the spring portion.

3. The fender structure for a vehicle according to claim 1, wherein the reinforcing member is formed to fill a gap between the fender panel and a vehicle-body constituent member which is disposed on the inner side in the vehicle width direction of the fender panel and to which the fender panel is attached.

4. The fender structure for a vehicle according to claim 1, wherein the spring portion has a plate shape with a meandering curve when seen in the vehicle width direction and is deformable in the vehicle height direction.

5. The fender structure for a vehicle according to claim 1, wherein the spring portion includes a closed-section portion that is rectangular when seen in the vehicle width direction, the closed-section portion is formed to be symmetric with respect to a center line in the vehicle height direction of the reinforcing member, a diagonal of the closed-section portion is disposed along the center line, and the spring portion is deformable in the vehicle height direction.

* * * * *